Oct. 10, 1933.  F. GOSSLAU  1,929,886
INTERNAL COMBUSTION ENGINE OF THE RADIAL TYPE
Filed Oct. 5, 1931 2 Sheets-Sheet 1
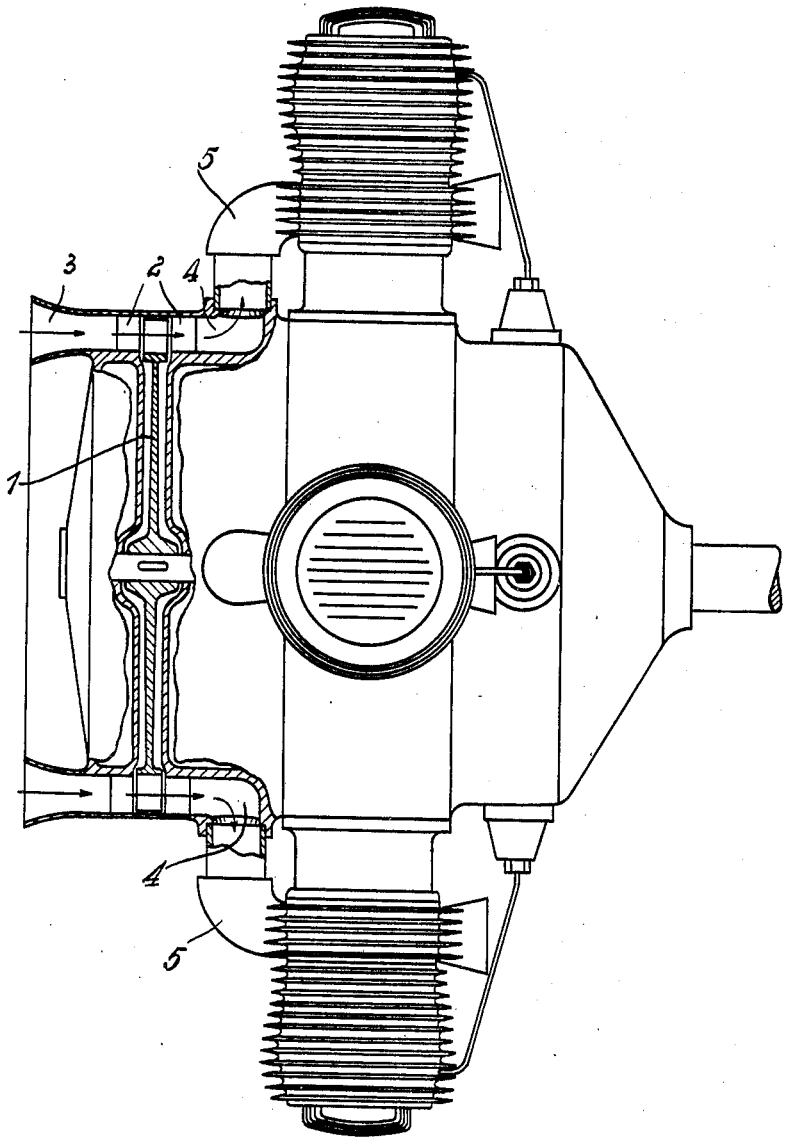

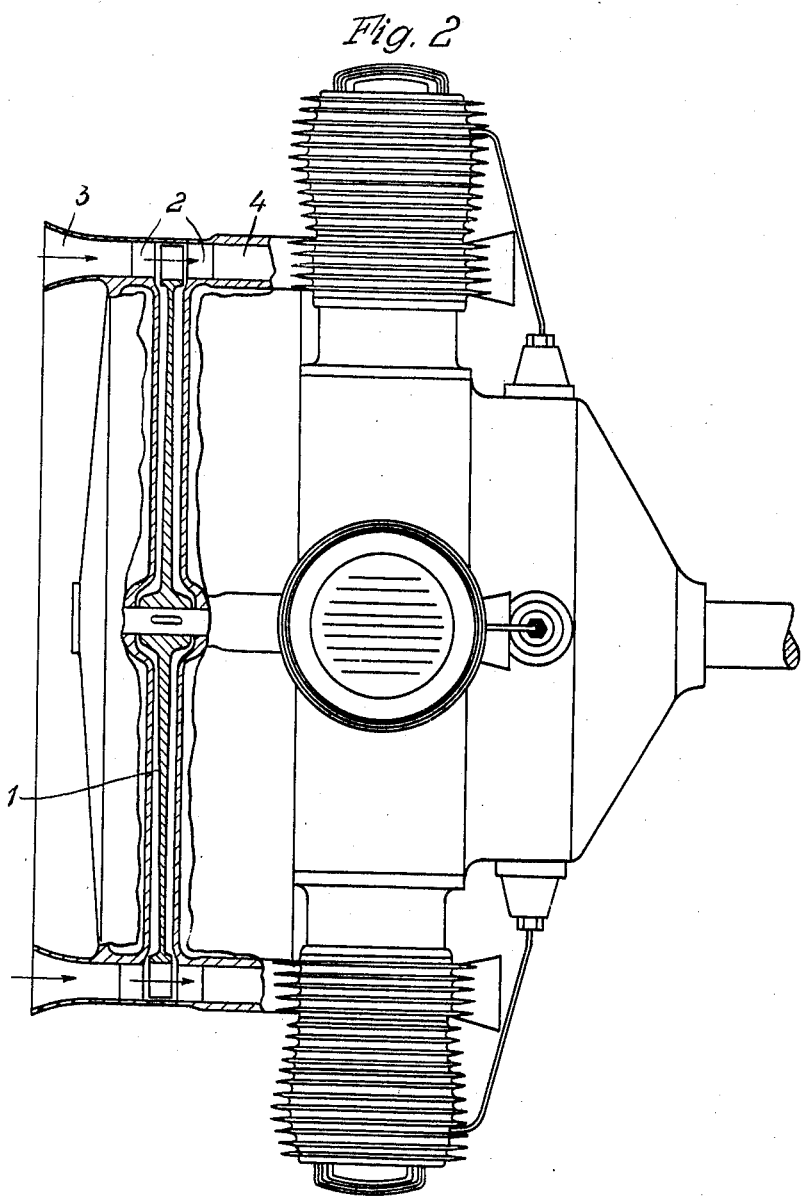

Patented Oct. 10, 1933

1,929,886

UNITED STATES PATENT OFFICE 1,929,886

INTERNAL-COMBUSTION ENGINE OF THE RADIAL TYPE

Fritz Gosslau, Berlin-Charlottenburg, Germany, assignor to Siemens & Halske, Aktiengesellschaft, Siemensstadt near Berlin, Germany, a corporation of Germany Application October 5, 1931, Serial No. 566,993, and in Germany August 29, 1930

2 Claims. (Cl. 123—55)

My invention relates to improvements in internal combustion engines of the radial type.

Radial internal combustion engines for high flights of airplanes and operating on the two-stroke cycle are equipped with a supercharging blower. Hitherto, the blowers used for supercharging or scavenging the cylinders were of the centrifugal type. Owing to the frequent deflections to which the gases are subjected and thereby to losses by impact, friction and increase of temperature, the efficiency of those blowers was, hitherto, far from being satisfactory, particularly with small engines running at very high speeds, as necessary for airplanes.

According to my invention the causes of the poor efficiency of such blowers are eliminated by avoiding as much as possible changes in the direction of the conveyed gases. In an engine with its cylinders arranged in star shape this is achieved by causing the runner of the blower convey the gases in a manner known per se not in the radial but in the axial direction, so that the annular pressure chamber from which all the cylinders are fed can be joined at the same diameter directly to the annular discharge opening of the blower.

In the accompanying drawings I have illustrated in side elevation, partly in section, two examples for carrying out the invention. They show internal combustion engines of the star-shape, i. e. raidal type provided with an axial blower, the latter being represented in section.

In Fig. 1 the connections between the axial blower and the individual cylinders of the internal combustion engine contain a bend, whereas in Fig. 2 these connections are straight.

The blower illustrated in Fig. 1 consists of a runner 1 driven from the crank shaft of the engine through a gearing, not shown in the drawing, and of stationary guide blades 2. 3 is the annular intake and 4 the annular pressure chamber which is of the same diameter as the runner, and joined directly to the annular discharge port of the blower as an axially directed continuation thereof. Through the runner of the blower the air is conveyed, without changing direction, from the intake 3 into the common pressure chamber 4, from which the individual cylinders are fed through connections 5.

With the blowers hitherto used, behind the runner, the kinetic energy of the discharged gases is by means of a guide apparatus converted into potential energy, and this latter form of energy is re-converted into kinetic energy when the inlet port is opened. Before the gases enter into a cylinder, their energy therefore undergoes two changes. According to the scientific investigations hitherto carried out, about 40 per cent of the pressure available in a scavenging blower is necessary after the piston has freed the inlet port, for example in a two-stroke cycle engine, to accelerate for the scavenging process the column of air in front of the inlet ports. This double conversion of the energy can be avoided still more effectively than in Fig. 1, if according to my invention the annular pressure chamber is so directly and closely connected with the intake ports of the several cylinders, that the accelerated air, delivered at least by those runner blades which pass an open intake port or its immediate vicinity, "shoots" as it were directly across the annular chamber into the open cylinder port or ports without the above mentioned double conversion of energy, and without any change in direction. For this purpose the runner diameter is dimensioned so that its blades are located in approximately the same radial zone as the cylinder inlet ports, thus enabling the runner blades to deliver the air at high speed directly into the open inlet ports across the annular distributing chamber.

The example illustrated in Fig. 2 shows diagrammatically a blower of that kind. Similar parts of the blower are marked with the same reference numerals as in Fig. 1.

The difference, compared with the first example, is that the annular chamber 4 is connected directly to the inlet ports of the cylinders, instead through individual connections 5 as in Fig. 1. In this case again the annular chamber 4 joins directly, at the same diameter, the annular discharge port of the blower.

I claim as my invention:

1. In a multi-cylinder internal combustion engine of the radial cylinder type, supercharging means comprising a rotary supercharging blower having rotor vanes arranged to convey the air in the direction of the rotor axis, and having an annular intake and discharge port co-diametrical with the rotor vanes, whereby an annular air stream is delivered in axial direction, an annular distributing chamber co-diametrical and directly connected with said annular discharge port, and connections between said chamber and the several cylinders.

2. In a multi-cylinder internal combustion engine of the radial cylinder type, supercharging means comprising a rotary supercharging blower having rotor vanes arranged to convey the air in the direction of the rotor axis, and having an annular intake and discharge port co-diametrical with the rotor vanes, whereby an annular air stream is delivered in axial direction, an annular distributing chamber co-diametrical with and directly connected at one side of said blower discharge port, the intake ports of said cylinders being directly attached to the other side of said chamber, whereby the air enters said cylinder intake ports substantially at an unbroken speed and substantially maintains the direction in which it is taken in by the blower.

FRITZ GOSSLAU.